(12) United States Patent
Chen et al.

(10) Patent No.: US 11,699,347 B2
(45) Date of Patent: Jul. 11, 2023

(54) DETERMINING ROAD SAFETY

(71) Applicant: Ford Global Technologies, LLC, Dearborn, MI (US)

(72) Inventors: Yu Chen, Belleville, MI (US); Arnold Babila, Ann Arbor, MI (US); Jonathan Scott, Chelmsford (GB); Junheung Park, Royal Oak, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 258 days.

(21) Appl. No.: 16/568,138

(22) Filed: Sep. 11, 2019

(65) Prior Publication Data
US 2020/0082721 A1 Mar. 12, 2020

(30) Foreign Application Priority Data

Sep. 12, 2018 (GB) ...................... 1814854

(51) Int. Cl.
| G08G 1/16 | (2006.01) |
| B60Q 9/00 | (2006.01) |
| B60W 50/04 | (2006.01) |
| B60W 50/08 | (2020.01) |
| B60W 50/14 | (2020.01) |

(Continued)

(52) U.S. Cl.
CPC ............ *G08G 1/16* (2013.01); *B60Q 9/008* (2013.01); *B60W 50/045* (2013.01); *B60W 50/085* (2013.01); *B60W 50/14* (2013.01); *B60W 60/0015* (2020.02); *G05D 1/0214* (2013.01); *G07C 5/02* (2013.01); *G08G 1/0129* (2013.01); *G08G 1/0141* (2013.01); *G08G 1/0145* (2013.01); *G08G 1/0962* (2013.01);

(Continued)

(58) Field of Classification Search
CPC ...... G08G 1/16; G08G 1/0129; G08G 1/0141; G08G 1/0967; G08G 1/096716; B60Q 9/008; B60W 50/045; B60W 50/085; B60W 50/14
See application file for complete search history.

(56) References Cited

U.S. PATENT DOCUMENTS

| 9,679,487 B1 | 6/2017 | Hayward |
| 2005/0149261 A9* | 7/2005 | Lee ................. G01C 21/30 |
| | | 701/472 |

(Continued)

FOREIGN PATENT DOCUMENTS

| DE | 102015015259 A1 | 5/2016 |
| GB | 2539470 A | 12/2016 |
| WO | 2017/041838 A1 | 3/2017 |

*Primary Examiner* — Kenneth J Malkowski
*Assistant Examiner* — Andrew J Cromer
(74) *Attorney, Agent, or Firm* — Brandon Hicks; Eversheds Sutherland (US) LLP

(57) ABSTRACT

According to one example there is provided a method comprising selecting a first location from a set of locations and analysing, by a processor, data collected from a first vehicle located within a first distance of the first location. A first value representative of a first performance parameter of the first vehicle is generated. A second value representative of a second performance parameter of the first vehicle is generated. At least one of the first and second values is compared with a first threshold and, when one of the first and second values is greater than the first threshold, a safety alert is issued greater than (in some examples, less than).

14 Claims, 5 Drawing Sheets

(51) Int. Cl.
*B60W 60/00* (2020.01)
*G05D 1/02* (2020.01)
*G07C 5/02* (2006.01)
*G08G 1/01* (2006.01)
*G08G 1/0962* (2006.01)

(52) U.S. Cl.
CPC ............ *G08G 1/164* (2013.01); *G08G 1/166* (2013.01); *G05D 2201/0213* (2013.01)

(56) References Cited

U.S. PATENT DOCUMENTS

| | | | |
|---|---|---|---|
| 2013/0162449 A1* | 6/2013 | Ginsberg | G08G 1/081 340/910 |
| 2013/0253816 A1* | 9/2013 | Caminiti | G08G 1/005 701/301 |
| 2016/0093210 A1* | 3/2016 | Bonhomme | G08G 1/0967 340/905 |

* cited by examiner

DETERMINING ROAD SAFETY

CROSS-REFERENCE TO RELATED APPLICATIONS

This application claims priority to and the benefit of United Kingdom patent application No. GB1814854.4, filed Sep. 12, 2018, which is hereby incorporated by reference herein in its entirety.

The present invention relates to a method and apparatus for determining road safety. In one example, the method relates to determining road safety at a particular location based on certain performance parameters one or more vehicles being operated at or near that location that may indicate how the vehicles are being driven.

BACKGROUND

Road safety is an important concern for many cities across the world, some of which have shown, or are showing, an increased commitment to reducing the number of road-related accidents and injuries. However, some cities may not have adequate resources to address safety concerns at every location within their cities. In particular, it may be difficult for some cities to identify the areas of higher risk to traffic accidents (for example, so as to reduce the risk of future accidents in that location).

STATEMENTS OF INVENTION

Identifying the areas in a city of high accident risk may be beneficial towards reducing the number of injuries and fatalities in that city. Some of examples of the disclosure presented herein relate to monitoring a performance parameter of a vehicle in a given location, and, when it is determined that the performance parameter is greater than, or less than, an acceptable threshold, an alert may be issued to give warning that an accident is likely. Consequentially, the alert may indicate that the given location is more susceptible to accidents.

According to one example of the present disclosure there is provided a method comprising: selecting a first location from a set of locations, analysing, by a processor, data collected from a first vehicle located within a first distance of the first location, generating a first value representative of a first parameter of the first vehicle, comparing the first value with a first threshold, and depending on whether the first value is greater than or less than the first threshold, issuing an alert.

Therefore, according to an example of the disclosure, a performance parameter of a vehicle in a given location is monitored and compared to an acceptable threshold. If the parameter is greater than (for certain parameters that, in some examples may include brake pedal pressure) or less than (for certain parameters that, in some examples, may include accelerator pressure) a threshold then it may be determined that there is a higher probability, or risk of, an accident in that location. For example, higher braking pressure than expected (e.g. relative to the first location) may suggest emergency braking. For example, lower accelerator pressure than expected may suggest that the driver feels that the conditions are not safe.

For example, the alert may be issued when the first value is greater than the first threshold. Accordingly, in one example there is provided a method comprising: selecting a first location from a set of locations, analysing, by a processor, data collected from a first vehicle located within a first distance of the first location, generating a first value representative of a first parameter of the first vehicle, comparing the first value with a first threshold, and, when the first value is greater the first threshold, issuing an alert.

For example, the alert may be issued when the first value is less than the first threshold. Accordingly, in one example there is provided a method comprising: selecting a first location from a set of locations, analysing, by a processor, data collected from a first vehicle located within a first distance of the first location, generating a first value representative of a first parameter of the first vehicle, comparing the first value with a first threshold, and, when the first value is less than the first threshold, issuing an alert.

The parameter(s) may be performance parameters of the vehicle as will be explained below.

The alert may be a safety alert.

According to an example of the disclosure there is provided a method comprising: selecting a first location from a set of locations, analysing, by a processor, data collected from a first vehicle located within a first distance of the first location, generating a first value representative of a first performance parameter of the first vehicle, generating a second value representative of a second performance parameter of the first vehicle, comparing at least one of the first and second vales with a first threshold and, when one of the first and second values is greater than the first threshold, issuing a safety alert.

The first parameter may be at least one of: the brake pedal pressure of the first vehicle, the speed of the first vehicle, the speed of the first vehicle engine, the steering wheel angle of the first vehicle, the rate of change of steering wheel angle of the vehicle, the accelerator pressure of the first vehicle, the state of at least one indicator of the first vehicle, the gear of the first vehicle, and the first vehicle type.

Therefore, according to an example of the disclosure, at least one performance parameter of a vehicle in a given location is monitored and compared to an acceptable threshold. If the parameter is greater than a threshold then it may be determined that there is a higher probability, or risk of, an accident in that location.

In some examples the threshold may be dependent on the location. For example, the parameter may be vehicle speed and the associated vehicle speed threshold may be a maximum speed threshold that may be the local speed limit of the first location. In another example, the location may be at, or near, a school and the vehicle speed threshold may be a lower speed limit.

The method may further comprise generating a plurality of values, wherein each value of the plurality of values is representative of a parameter of the first vehicle, and wherein the first value is one of the plurality of values, comparing each one of the plurality of values to a respective threshold value, and depending on whether each one of the values is greater than (in some examples, less than) its respective threshold, issuing an alert.

Each value of the plurality may be one of: the brake pedal pressure of the first vehicle, the speed of the first vehicle, the speed of the first vehicle engine, the steering wheel angle of the first vehicle, the accelerator pressure of the first vehicle, the state of at least one indicator of the first vehicle, the gear of the first vehicle, and the first vehicle type.

Therefore, in some examples of the disclosure, more than one parameter is monitored and each parameter is compared to an associated threshold. In such examples, an alert may be issued when both parameters exceed, or fall short of, their respective parameters. For example, one parameter may be brake pedal pressure (e.g. the first parameter in the method descried above-consequentially in this example the first value may be a brake pedal pressure value and the first threshold may be a brake pedal pressure threshold). In this example, however the method may also monitor the vehicle speed and the engine speed. For example, the data collected from the first vehicle comprises brake pedal pressure data, vehicle speed data, and engine speed data. In this example, the method may further comprise: generating a vehicle speed value representative of the speed of the first vehicle, generating an engine speed value representative of the engine speed of the first vehicle, comparing the vehicle speed value to a vehicle speed threshold, comparing the engine speed value to an engine speed threshold; and, when the brake pedal pressure value is greater than the brake pedal pressure threshold and/or the vehicle speed value is greater than the vehicle speed threshold and/or the engine speed value is greater than the engine speed threshold, issuing a safety alert.

In this example, therefore, the safety alert is issued when at least one of a number of parameters (three, in this example) are greater than their respective thresholds. In this example the brake pedal pressure threshold, the vehicle speed threshold, and engine speed threshold are maximum thresholds. In this example, the alert is issued when both the vehicle and engine speeds are determined to be above a maximum acceptable level but in combination with the brake pedal pressure being below a minimum acceptable level this combination could indicate that a vehicle is begin drive at high speeds with the operator not showing any signs of slowing the vehicle. In one scenario, if the first location, is a school or proximate a junction where cornering and/or slowing is expected then the alert may be issued. In another scenario, if the first location is on a city freeway or highway where the vehicle is expected to be travelling fast then an alert may not be issued. Hence, the whether the alert is issued may, in some examples, be dependent on the first location.

The first threshold may be determined, and/or adjusted, based on one of the generated values. For example, a brake pressure threshold may be dependent on the vehicle speed or engine speed and, in this example, the brake pressure threshold may be determined, and/or adjusted, based on the determined speed of the vehicle or engine.

The alert may be issued in real-time or near real-time. The alert may be issued to the driver of the first vehicle, or is issued at a location remote from the vehicle.

This allows the driver of the vehicle to be issued with a warning for—example an audible warning—that they are operating the vehicle in an unsuitable way for the vehicle's location (in one of the examples above, driving too fast for a school zone).

In some examples therefore the vehicle may comprise an alert device to issue the warning signal, e.g. to an occupant of the vehicle. In other examples the alert may be issued at a remote location. The remote location could comprise, for example, a police station. This could alert police to the high probability of an accident occurring in that location due to the behaviour of the driver of the first vehicle and police could go to the first location or mark the first location as a 'higher probability risk area'.

In other examples, the alert may be issued to a traffic controller which is configured to control traffic signals in the region of the first location. For example, the vehicle may be operated at a speed exceeding a maximum speed threshold and the alert may be issued to a traffic controller which, in one example, could change the traffic signals in the first location to be red to try and force traffic to a stop to prevent an accident.

In other examples, the alert may be issued to a remote processor that can flag that location as an area of higher probability of accident. The processor may be part of, or in communication with, a database for storing locations at which alerts have been issued.

Selecting the first location from the set of locations may comprise: analysing, by a processor, location data collected from a monitoring service of a computing system, the location data comprising a set of location data points, generating, for each location data point in the location data, a location value representative of a first location parameter of the location data, comparing each location value with a first location threshold to determine the set of location data points that have a location value greater than, or less than, the first location threshold, and selecting one of the location data points that has a location value greater than, or less than, the first location threshold as the first location.

Therefore, in some examples, the method may select the first location based on locations which have a higher percentage of accidents, e.g. based on historical data. Such examples allow driver behaviour to be correlated with, e.g. known accident "hotspots", since the first location may be a location where a plurality of parameters exceed, or fall short of, acceptable thresholds and therefore vehicle parameters in this area are monitored to assess the level of accident risk in an already accident-prone area.

In other examples, weather data may be used to select the first location (e.g. locations experiencing heavy rain and/or wind) and/or traffic data may be used (e.g. locations may be selected that are experiencing heavy traffic).

The location data point in the set of location data points having a location value exceeding the first location threshold that is the closest in distance to the location of the first vehicle may be selected as the first location.

The first location parameter may be at least one of: the number of traffic accidents that have occurred at each location data point, the average severity of the traffic accidents that have occurred at that location data point, the traffic data at that location data point, the weather at that location data point, the time of day, the road surface at that location data point.

In one example, the method may further comprise: generating, for each location data point in the location data, a plurality of values, wherein each one of the plurality of values is representative of a location parameter of the location data, the location value being one of the plurality, comparing each one of the plurality of values to a respective threshold, and wherein selecting the first location is based on the comparison.

The method, in one example, may further comprise: generating a second value representative of a second parameter of the first vehicle, comparing the second value with at least one of: the behaviour of at least one vehicle within a second distance of the first vehicle and the behaviour of at least one pedestrian within a third distance of the first vehicle, and wherein the alert is issued based on the comparison of the second value.

Therefore, some examples may compare the vehicle behaviour to pedestrian behaviour, or to the behaviour of another vehicle, and issue an alert based on both. For example, the other vehicle may be a ridden vehicle (for example, a bicycle) and the comparison may (for example)

be based on at least one of: the proximity of the ridden vehicle to the first vehicle and the speed of the ridden vehicle.

The pedestrian (or other vehicle) behaviour could be monitored by, e.g., a smartphone which may send data comprising pedestrian behaviour (for example, proximity to the road, walking speed, etc.) for comparison with the first vehicle parameters. This comparison may be performed in real-time or near real-time The method may further comprise transmitting data collected from a first vehicle to a second vehicle. The method may further comprise transmitting data collected from a second vehicle to a first vehicle. In this way, data may be shared between two vehicles and the behaviour of the two vehicles may be compared by the driver's themselves. In other examples, vehicle data may be sent to a remote location.

In one example, the method may further comprise: analysing, by a processor, data collected from a second vehicle located within a third distance of the first location, generating a second value representative of the first parameter of the second vehicle, comparing the second value with the first threshold; and depending if the first and second values are both greater than (in some examples, less than) the first threshold, issuing an alert.

The method may, in one example, further comprise: generating a first plurality of values, wherein each value of the first plurality is representative of a first parameter of the first vehicle, and wherein the first value is one of the first plurality, generating a second plurality of values, wherein each value of the second plurality is representative of a second parameter of a second vehicle, the second vehicle being within a fourth distance of the first location, comparing each one of the first and second pluralities of values to a respective threshold value, and depending if each one of the values is greater than (in some examples, less than) its respective threshold, issuing an alert.

Each value of the first and second pluralities may be one of: the brake pedal pressure of the first vehicle, the speed of the first vehicle, the speed of the first vehicle engine, the steering wheel angle of the first vehicle, the rate of change of the steering wheel angle of the first vehicle, the accelerator pressure of the first vehicle, the state of at least one indicator of the first vehicle, the gear of the first vehicle, and the first vehicle type.

Therefore, some examples of the disclosure are able to compare behaviour between two vehicles in a similar location (e.g. two vehicles within a certain distance of the first location). For example, behaviour may be compared between two vehicles in the same location in the same time.

For example, a first vehicle may be being operated at a first vehicle speed that exceeds a maximum threshold and a second vehicle may be operated at a second vehicle speed that exceeds a maximum threshold, and an alert may be issued (e.g. to the driver of at least one of the vehicles, e.g. both) as this may be determined to be a high risk situation. For example, the two vehicles may be both approaching the same location at high speeds and therefore there may be a high probability of the vehicles colliding at this location.

This location may then be logged (e.g. in a database) as a location of higher accident probability, having been determined as such based on the instance of two vehicles being operated at high speeds.

In one example, a location associated with a minimum number of alerts (e.g. two) may be logged as a "high-risk" location.

The method may comprise assigning a level of traffic safety to the first location, e.g. if an alert is issued. The method may comprise storing the first location in a database, e.g. if an alert is issued. Therefore, the method may allow the first location to be logged if it is determined that it is a higher risk location based on the behaviour of the first vehicle.

According to another example of the present disclosure there is provided a processing apparatus comprising: a location module configured to select a first location from a set of locations, a processor configured to analyse data collected from a first vehicle located within a first distance of the first location, and an analytics module configured to generate a first value representative of a first parameter of the first vehicle, and configured to comparing the first value with a first threshold; and configured to issue an alert depending on whether the first value is greater than (in some examples, less than) the first threshold.

The analytics module may be configured to generate a plurality of values, wherein each value of the plurality is representative of a parameter of the first vehicle, and wherein the first value is one of the plurality, configured to compare each one of the plurality of values to a respective threshold value; and configured to issue an alert depending on whether each one of the values is greater than (in some examples, less than) its respective threshold.

The first parameter may be brake pedal pressure and the first value is a brake pedal pressure value and the first threshold is a brake pedal pressure threshold, and wherein the analytics module is configured to: generate a vehicle speed value representative of the speed of the first vehicle, generate an engine speed value representative of the engine speed of the first vehicle, compare the vehicle speed value to a vehicle speed threshold, compare the engine speed value to an engine speed threshold, and, issue an alert when the brake pedal pressure value is less than the brake pedal pressure threshold and the vehicle speed value is greater than the vehicle speed threshold and the engine speed value is greater than the engine speed threshold.

The analytics module may be configured to issue the alert in real-time or near real-time. The analytics module may be configured to issue an alert to the driver of the first vehicle, or at a location remote from the vehicle.

The processor is a first processor, the apparatus further comprising a second processor configured to analyse location data collected from a monitoring service of a computing system, the location data comprising a set of location data points; and wherein the analytics module is a first analytics module, the apparatus further comprising a second analytics module configured to: generate, for each location data point in the location data, a location value representative of a first location parameter of the location data, compare each location value with a first location threshold to determine the set of location data points that have a location value greater than, or less than, the first location threshold, and select one of the location data points that has a location value greater than, or less than, the first location threshold as the first location.

The analytics module may be configured to: generate, for each location data point in the location data, a plurality of values, wherein each one of the plurality of values is representative of a location parameter of the location data, the location value being one of the plurality, compare each one of the plurality of values to a respective threshold, and to select the first location based on the comparison.

The analytics module is configured to: generate a second value representative of a second parameter of the first vehicle, compare the second value with at least one of: the behaviour of at least one vehicle within a second distance of the first vehicle and the behaviour of at least one pedestrian within a third distance of the first vehicle, and to issue the alert based on the comparison of the second value.

The processing apparatus may further comprise a processor configured to analyse data collected from a second vehicle located within a third distance of the first location; and wherein the event analytics module is configured to: generate a second value representative of the first parameter of the second vehicle, compare the second value with the first threshold, and to issue an alert depending on whether the first and second values are greater than (in some examples, less than) the first threshold.

The analytics module may be configured to: generate a first plurality of values, wherein each value of the first plurality is representative of a first parameter of the first vehicle, and wherein the first value is one of the first plurality, generate a second plurality of values, wherein each value of the second plurality is representative of a second parameter of the second vehicle, the second vehicle being within a fourth distance of the first location, compare each one of the first and second pluralities of values to a respective threshold value, and issue an alert depending on whether each one of the values is greater than (in some examples, less than) its respective threshold.

The processing apparatus may comprise a database for storing locations at which alerts have been issued.

According to another example of the present disclosure there is provided a non-transitory machine-readable storage medium, encoded with instructions executable by a processor, the machine-readable storage medium comprising instructions to cause the processor to perform the method as described above.

According to another example there is provided a method comprising: analysing, by a processor, location data collected from a monitoring service of a computing system, the location data comprising a set of location data points, generating, for each location data point in the location data, a location value representative of a first location parameter of the location data, comparing each location value with a location threshold to determine the set of location data points that have a location value greater than, or less than, the first location threshold; and issuing an alert when one of the location values exceeds the location threshold.

The alert may be issued in real-time or near real-time. The first location parameter may be at least one of: the number of traffic accidents that have occurred at each location data point, the average severity of the traffic accidents that have occurred at that location data point, the traffic data at that location data point, the weather at that location data point, the time of day, the road surface at that location data point. In other examples, a plurality of locations values may be generated and compared with a respective threshold, each value may correspond to a different location parameter.

This example therefore allows a set of locations to be monitored and an alert to be issued when one, or more, values exceeds, or falls below, an acceptable threshold.

For example, an alert may be issued when the average accident severity at a location, or set of locations, is above an acceptable maximum threshold; and/or an alert may be issued when the amount of accidents occurring at a location, or set of locations, is above an acceptable maximum threshold.

BRIEF DESCRIPTION OF THE DRAWINGS

For a better understanding of the present disclosure, and to illustrate how it may be put into effect, examples will now be described with reference to the accompanying drawings in which.

DETAILED DESCRIPTION

Figure 1:
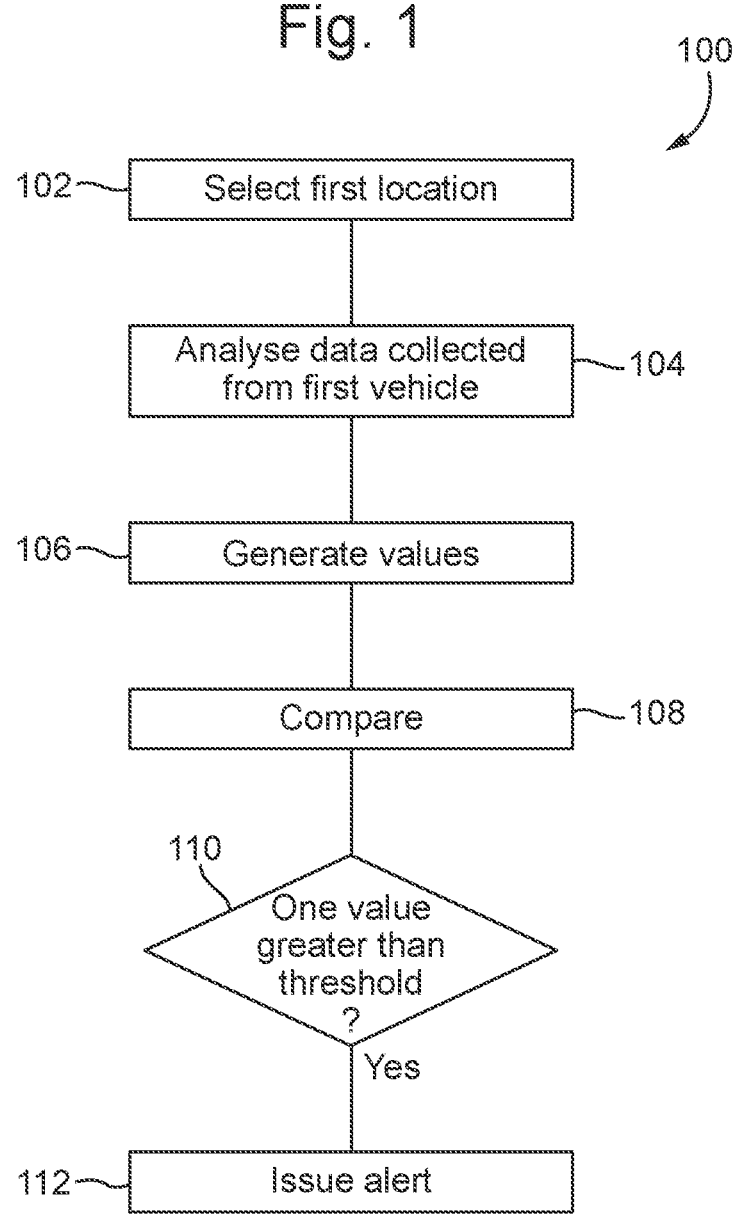
FIG. 1 is a flowchart of an example method.

FIG. 1 shows an example method 100. The method 100 may be a method for assessing the road safety risk at a given location. The method 100 may be a method of determining a risk factor at a given location. More generally, the method 100 may be a method of determining road safety.

At block 102, the method 100 comprises selecting a first location from a set of locations. Block 102, in some examples, may comprise a user manually selecting a location, for example a location in a city selected from a city map or user directory. In other examples, block 102 may be performed automatically, e.g. by a processor, a location from the set of locations based on at least one criteria to be explained with reference to another example below.

At block 104, the method 100 comprises analysing, by a processor, data collected from a first vehicle located within a first distance of the first location. The data may, in some examples, be streamed from the vehicle. In one example, the vehicle may transmit data to a remote storage device, such as a cloud device, and the stored data may be received by a device comprising the processor for analysis. In other examples, a device on or in the vehicle itself, such as a plug-in device, may transmit data to another location, such as a server device (e.g. via a cellular network). In one example, a "plug-in device" on the vehicle or embedded modem may constantly monitor a controller area network (CAN) device of the vehicle to collect the required data from the CAN device (such as a bus) and transmit at least a part of the data to another location for analysis, e.g. via a cellular network.

At block 106, the method 100 comprises generating values representative of respective performance parameters of the first vehicle. For example, block 106 may comprise generating a first value representative of a first performance parameter of the first vehicle and generating a second value representative of a second performance value of the first vehicle. The performance parameters may be at least one of: the brake pedal pressure of the first vehicle, the speed of the first vehicle, the speed of the first vehicle engine, the steering wheel angle of the first vehicle, the rate of change of steering wheel angle of the first vehicle, the accelerator pressure of the first vehicle, the state of at least one indicator of the first vehicle, the gear of the first vehicle, and the first vehicle type.

Therefore, block 106 may comprise generating values representative of the behaviour of the vehicle, for example how the vehicle is being operated. As will explained below, in subsequent steps, these may be assessed to determine if the vehicle is being operated "at-risk" and therefore may be used to determine a risk of accident at the first location.

At block 108, the method 100 comprises comparing at least one value with a first threshold; and at block 110, it is determined whether this value is greater than (in some example, less than) the first threshold. If it is determined at block 110 that the first value is greater than or less than the first threshold then the method 100 proceeds to block 112 at which an alert is issued, e.g. a safety alert.

For example, at block 106 the method 100 may comprise generating a value representative of the brake pedal pressure of the first vehicle. At block 108 this value may be compared with a threshold brake pedal pressure which may indicate a minimum brake pedal pressure which should be applied for the vehicle to be considered to be operated safely. Accordingly, at block 110 if it is determined that the brake pedal pressure value is less than the threshold an alert may be issued at block 112 which may indicate that the vehicle is being operated at risk (e.g. to other vehicles or pedestrians) or that there is a heightened risk of accident. For example, the first location may represent a roundabout or a corner or T-intersection and so a minimal amount of brake pressure may be expected to be applied by a user of the vehicle so as to decelerate the vehicle to a speed appropriate for entering the roundabout or for taking corners, etc. Accordingly, the applied brake pedal pressure being below the minimum threshold (as determined at block 110) at the first location may cause the alert to be issued at block 112 as this may, in this example, indicate that the vehicle is heading toward the first location too fast.

Alternatively, the brake pedal threshold may be a maximum threshold as higher braking pressure than expected may suggest that the driver is emergency braking, and this may cause the alert to be issued at block 112.

By way of another example, at block 106 the method 100 may comprise generating a value representative of the gear of the first vehicle. At block 108 this value may be compared to a threshold gear number which may indicate a minimum gear, or a maximum gear, at which the vehicle would be considered to be operated safely. For example, if the first location were on, and in the middle of, a freeway then the threshold gear may be fourth of fifth, indicating a minimum range of speeds that are considered safe. If the vehicle's gear were below this threshold then this may indicate that the vehicle is being operated at too low a gear (and therefore too slowly) for its location (the first location being on a freeway where the speed limit may be comparatively high). Alternatively, the first location could be at, or near, a school zone and the threshold gear may be, for example, third gear, and if the operated gear is above this threshold then this may indicate that the vehicle's speed is too fast for the school zone. In each of these examples, an alert may be issued to alert someone (for example, the driver or a remote party) of the risk.

By way of a further example, if the value is representative of the vehicle speed then the threshold may be a maximum threshold (such as the local speed limit at the first location). When the vehicle speed value is above this threshold then it is determined that the vehicle is being operated above the local speed limit and hence the alert is issued at block 112.

Hence, the method 100, at block 110, comprises comparing the value to a threshold and issuing an alert when the value is greater (in some examples) or less (in other examples) than the threshold since whether there is a risk may depend on the type of parameter being monitored.

As will now be explained with reference to FIG. 2, multiple values may be used, and the alert may be issued when a combination of values is above, or below, the threshold.

Figure 2:
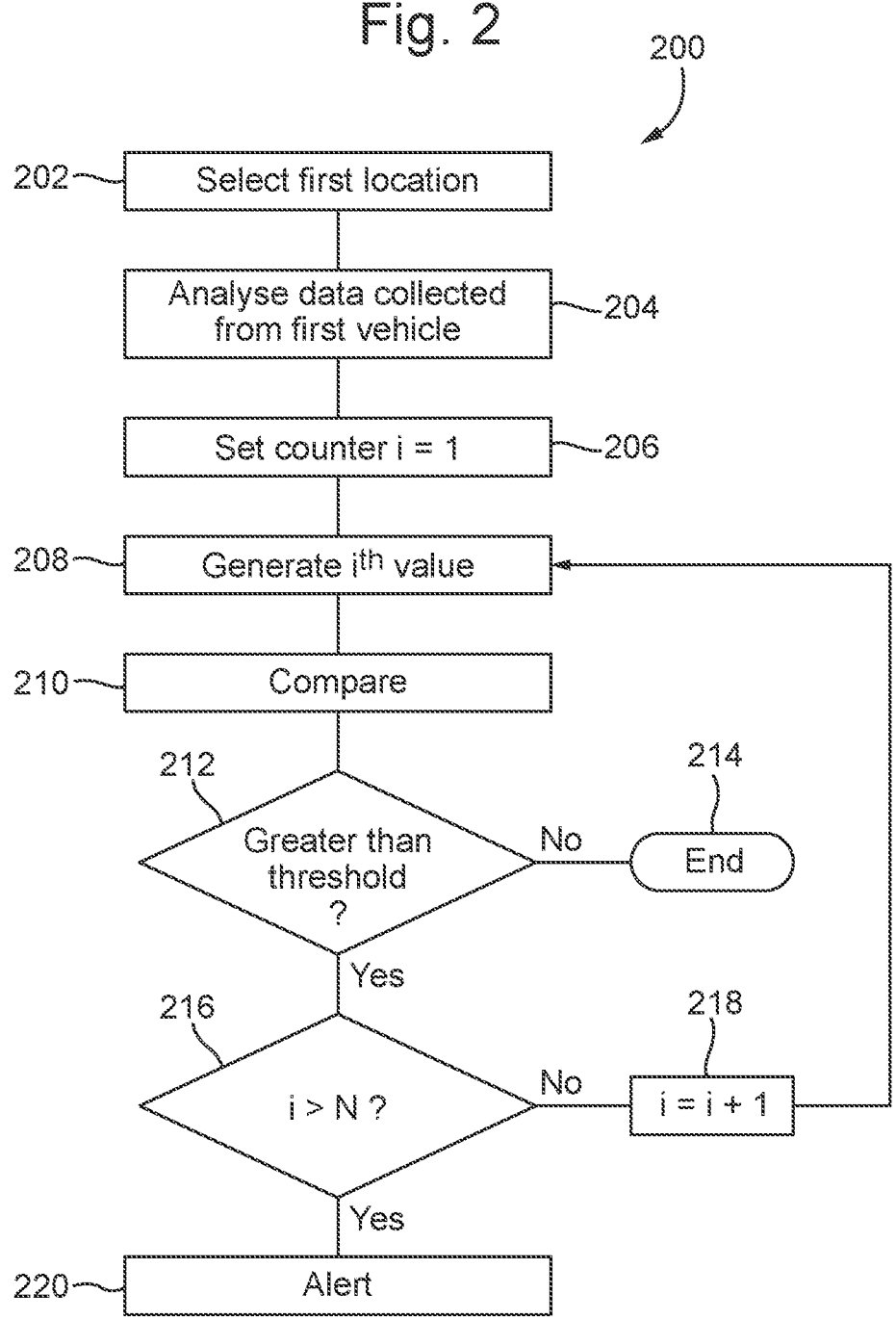
FIG. 2 is a flowchart of an example method.

FIG. 2 shows a method 200 in which comprises generating a plurality of values, each value of the plurality being representative of a parameter of the first vehicle, and wherein the first value is one of the plurality, then comparing each one of the plurality of values to a respective threshold value. As for the example of FIG. 1, depending on whether each one of the values is greater than (in some examples, less than) its respective threshold, an alert may be issued.

The method 200 of FIG. 2 may be a method for assessing the road safety risk at a given location. The method 200 may be a method of determining a risk factor at a given location. More generally, the method 200 may be a method of determining road safety.

At block 202 the method 200 comprises selecting a location from a set of locations. As for the method 100, block 202, in some examples, may comprise a user manually selecting a location, for example a location in a city selected from a city map or user directory. In other examples, block 202 may be performed automatically, e.g. by a processor, a location from the set of locations based on at least one criteria to be explained with reference to another example below.

At block 204, the method 200 comprises analysing, by a processor, data collected from a first vehicle located within a first distance of the first location. The data may, in some examples, be streamed from the vehicle. In one example, the vehicle may transmit data to a remote storage device, such as a cloud device, and the stored data may be received by a device comprising the processor for analysis. In other examples, a device on or in the vehicle itself, such as a plug-in device, may transmit data to another location, such as a server device (e.g. via a cellular network). In one example, a "plug-in device" on the vehicle or embedded modem may constantly monitor a controller area network (CAN) device of the vehicle to collect the required data from the CAN device (such as a bus) and transmit at least a part of the data to another location for analysis, e.g. via a cellular network.

At block 206 the method 200 setting a counter i=1. In this example, N values are to be generated and so the counter i will count from 1 to N. In this example, N values are to be generated with each one of the N values representing a parameter (in one example, a different parameter) of the first vehicle. The parameter(s) may be at least one of: the brake pedal pressure of the first vehicle, the speed of the first vehicle, the speed of the first vehicle engine, the steering wheel angle of the first vehicle, the accelerator pressure of the first vehicle, the state of at least one indicator of the first vehicle, the gear of the first vehicle, and the first vehicle type.

At block 208, the method 200 comprises generating a first (the ith) value, this value being representative of a first (ith) parameter of the first vehicle. At block 210 this value is compared with a threshold Ti, and at block 212 the method comprises determining whether the ith value is greater than, or less than, its respective threshold Ti. If not, the method 200 advances to block 214 where it ends. As will be appreciated, whether the ith value is greater than or less than its respective threshold may depend on at least one of the first location and the type of value that is being measured (e.g. gear or engine speed, etc.).

If, at block 212 it is determined that the ith generated value is greater than, or less than, its respective threshold then the method advances to block 216 at which it is determined whether the counter i has reached N. If the counter i has not reached N then the method proceeds to block 218 in which the counter is incremented by 1 and the method returns back to block 216, and the next value is generated (e.g. a value corresponding to the next parameter). The method 200 then comprises performing blocks 210 and 212 for the subsequent value.

Having generated the required number of values, and if all of those values were determined (at block 212) to be greater than, or less than, their respective thresholds, then the method 200, at block 220 comprises issuing an alert. Therefore, the example of FIG. 2 comprises generating a plurality of values, each representing a parameter, and comparing these values to individual thresholds. An alert is issued if each value is determined to be too low, or too high, relative to their respective threshold. Thus, the example of FIG. 2 may be used in example situations where an individual measured performance parameter is not enough to make a risk assessment, which is instead one on the basis of two or more parameters. For example, a vehicle being operated at too high a gear (e.g. the determined gear is assessed to be above a maximum gear threshold) may not on its own be enough for one example method to determine that there is a risk, but in combination with, for example, accelerator pedal pressure being above a maximum threshold pressure may indicate that the vehicle is being operated at a high speed with no signs of the driver slowing, and in this example an alert may be issued to alert the driver of the vehicle (or a remote source) of a risk of accident.

Figure 3:
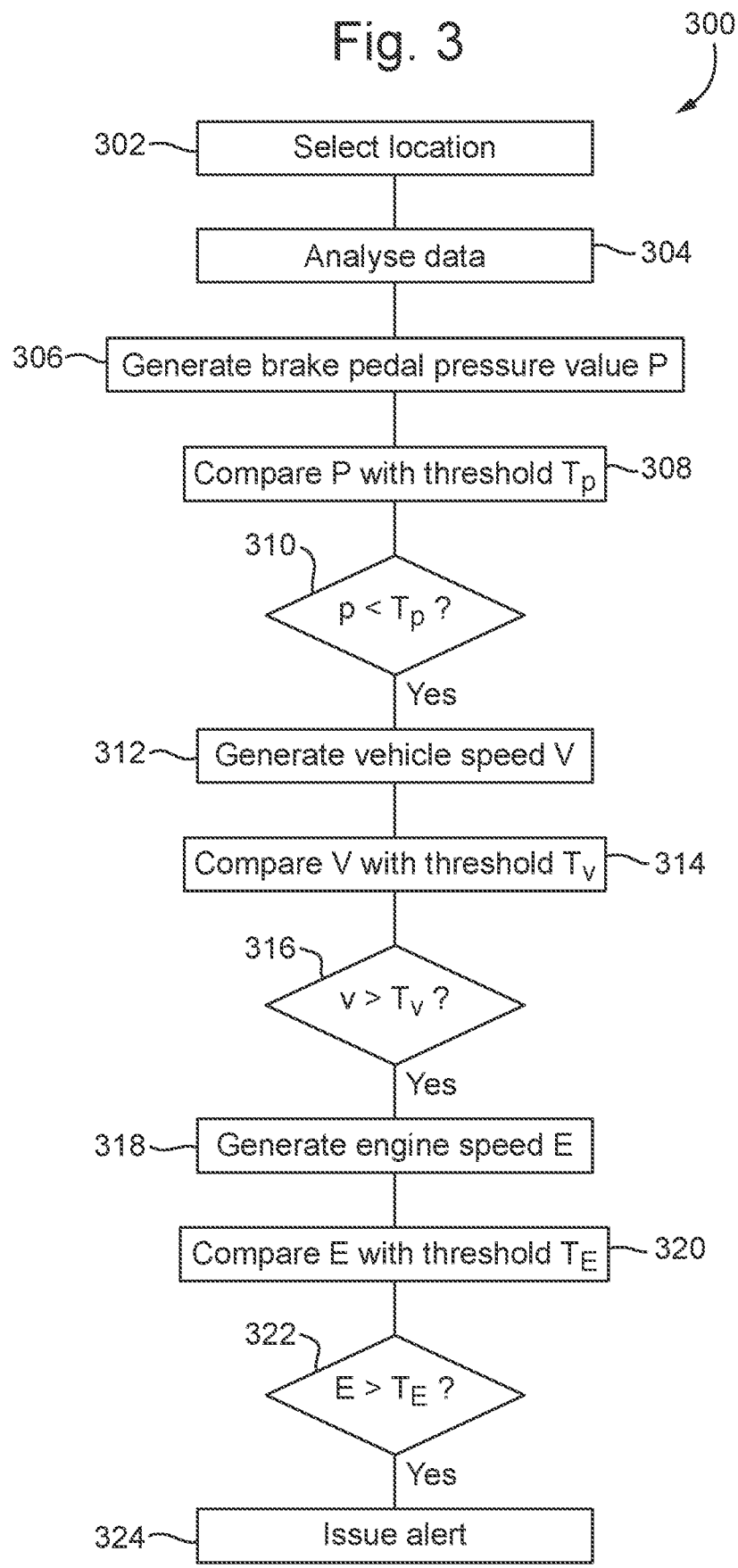
FIG. 3 is a flowchart of an example method.

Once example of FIG. 2 (where N=3, and where each value represents a specific and different parameter) is depicted in FIG. 3 and will now be described.

FIG. 3 shows an example method 300, which may be an example of the method 200 of FIG. 2. At block 302 the method 300 comprises selecting a location from a set of locations. At block 304, the method 300 comprises analysing, by a processor, data collected from a first vehicle located within a first distance of the first location.

At block 306 the method comprises generating a brake pedal pressure value and at block 308 the method comprises comparing this generated value to a brake pedal pressure threshold. At block 310 it is determined whether the generated brake pedal pressure value is lower than a brake pedal pressure threshold and if it is the method proceeds to block 312 at which a vehicle speed value is generated. At block 314 the generated vehicle speed value is compared to a vehicle speed threshold and, if at block 316 it is determined that this value exceeds the vehicle speed threshold then at block 318 an engine speed value is generated and, at block 320, is compared to an engine speed threshold. If the engine speed value is greater than the threshold (determined at block 322) then at block 324 an alert is issued. The vehicle speed threshold may, for example, be the local speed limit. Therefore, in the example of FIG. 3 an accident probability, or risk, is determined when the vehicle is being operated at too low a break pressure, with too high a vehicle and engine speed. This may represent the vehicle being operated too fast (e.g. for the first location) with no signs of slowing. An alert may not be issued if, for example, the brake pedal pressure is over a minimum brake pedal pressure threshold as this example may represent the driver attempting to slow the vehicle even though its speed may exceed the local speed limit.

Alternatively, the brake pedal pressure threshold may be a maximum threshold and, at block 310, it may be determined that the brake pedal pressure value is above the threshold and, if it is, the method 300 may proceed to block 312.

It will be appreciated that the order in which these steps are depicted in, and described with reference to, FIG. 3 is for illustrative purposes only.

Figure 4:
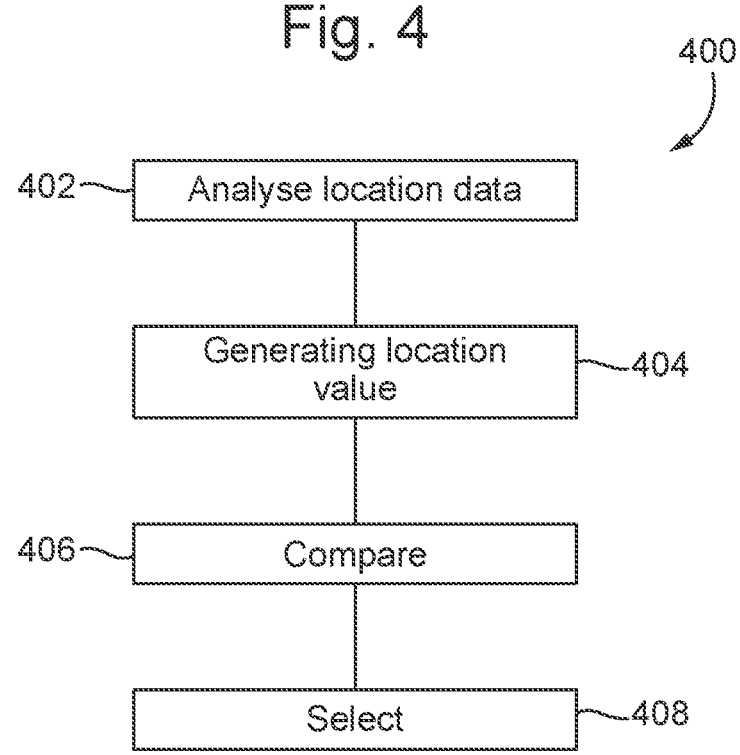
FIG. 4 is a flowchart of an example method.

FIG. 4 shows an example method 400 for selecting a first location from a set of locations. The method 400 of FIG. 4 may be utilised in any of blocks 102, 202, or 302 of the example methods of FIGS. 1, 2, and 3, respectively. Alternatively, the method may be a stand-alone method and may not be used in conjunction with any of the methods of the examples of FIG. 1, 2, or 3.

The method 400 comprises, at block 402, analysing, by a processor, location data collected from a monitoring service of a computing system, the location data comprising a set of location data points. In one example, the location data comprises a set of location data points within a distance (e.g. a radius) of a vehicle (e.g. the first vehicle).

At block 404, the method 400 comprises generating, for each location data point in the location data, a location value representative of a first location parameter of the location data. The first location parameter may be any of, e.g. at least one of, the number of traffic accidents that have occurred at each location data point, the average severity of the traffic accidents that have occurred at that location data point, the traffic data at that location data point, the weather at that location data point, the time of day, the road surface at that location data point.

At block 406, the method 400 comprises comparing each location value with a first location threshold to determine the set of location data points that have a location value greater than, or less than, the first location threshold.

At block 408, the method 400 comprises selecting one of the location data points that has a location value greater than, or less than, the first location threshold as the first location.

For example, if the location value generated at block 404 is representative of the number of traffic accidents, then at block 406 this may be compared to a maximum number of traffic accidents, and if it is determined that the value is over this maximum threshold then it may be determined that this location is dangerous, or at risk of accident, and so it may be selected as the first location.

In one example, block 404 may comprise generating a plurality of location values, and at block 406 each one of the plurality of location values may be compared to a respective threshold. For example, block 404 may comprise a value representing the traffic data, and the weather at a given location. If the traffic data, when compared to a traffic data threshold, is above a maximum threshold indicating the presence of heavy traffic and if the weather data is above a weather data threshold indicating bad weather (e.g. heavy rain and/or wind) then this location may be selected as the first location, as this may indicate that this location is susceptible to traffic accidents, due to the traffic and weather thresholds being exceeded.

Figure 5:
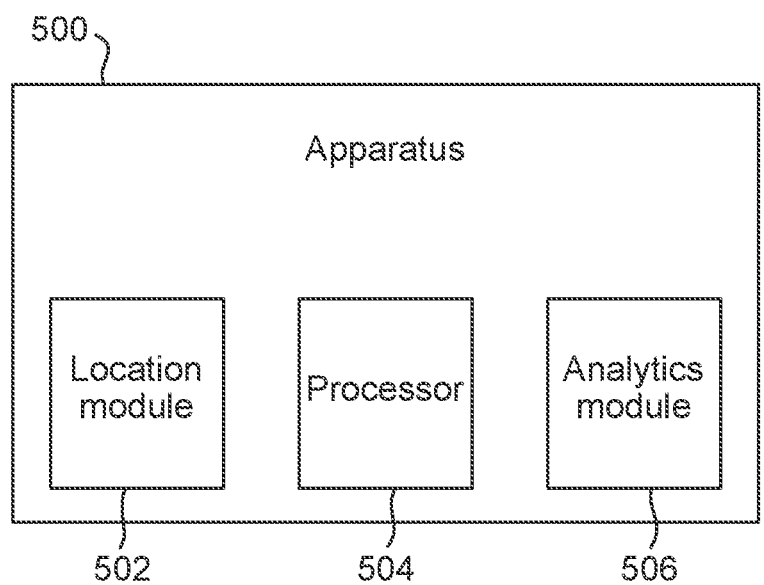
FIG. 5 is an example processing apparatus.

FIG. 5 shows a processing apparatus 500. The processing apparatus 500 comprises a location module 502 configured to select a first location from a set of locations, and a processor 504 configured to analyse data collected from a first vehicle located within a first distance of the first location, and an analytics module 506 configured to generate a first value representative of a first parameter of the first vehicle, and configured to comparing the first value with a first threshold; and configured to issue an alert depending on whether the first value is greater than (in some examples, less than) the first threshold.

The processing apparatus 500 may be configured to perform the method according to any one of the examples of FIGS. 1-4.

Figure 6:
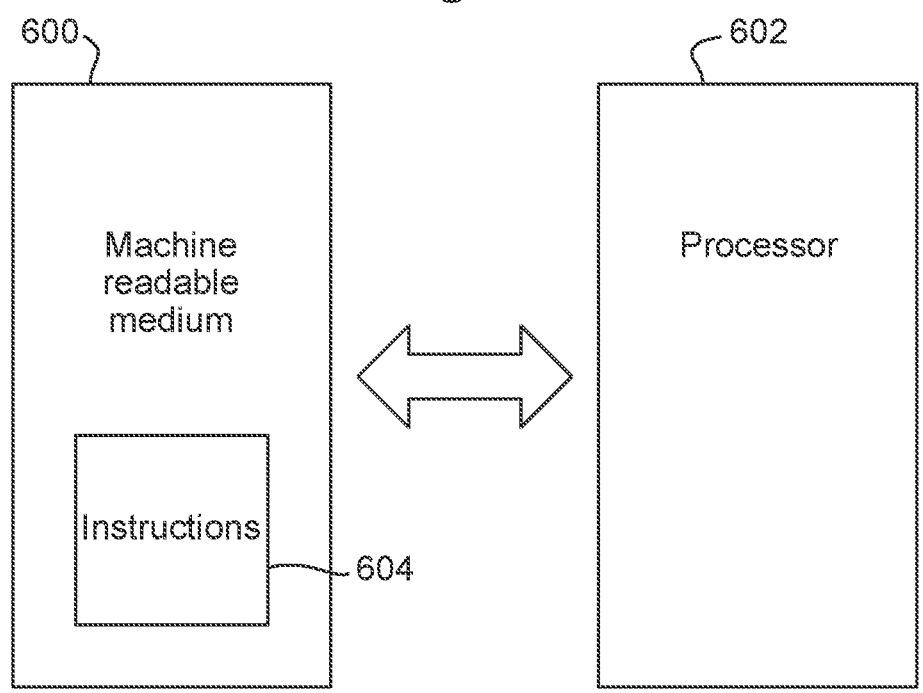
FIG. 6 is an example of a machine readable medium in association with a processor.

FIG. 6 is an example of a tangible (and non-transitory) machine readable medium 600 in association with a processor 602. The tangible machine readable medium 600 comprises instructions 604 which, when executed by the processor 602, cause the processor 602 to carry out a plurality of tasks. For examples, the instructions 604 may comprise instructions to cause the processor 602 to perform the method according to any one of the examples of FIGS. 1-4.

Examples of the present disclosure may be provided according to one of the following numbered statements:

Statement 1. A method comprising:
- selecting a first location from a set of locations;
- analysing, by a processor, data collected from a first vehicle located within a first distance of the first location;
- generating a first value representative of a first parameter of the first vehicle;
- comparing the first value with a first threshold; and
- depending on whether the first value is greater than (in some examples, less than) the first threshold, issuing an alert.

Statement 2. The method of Statement 1 wherein the first parameter is at least one of: the brake pedal pressure of the first vehicle, the speed of the first vehicle, the speed of the first vehicle engine, the steering wheel angle of the first vehicle, the accelerator pressure of the first vehicle, the state of at least one indicator of the first vehicle, the gear of the first vehicle, and the first vehicle type.

Statement 3. The method of Statement 1 or 2, the method further comprising:
- generating a plurality of values, wherein each value of the plurality is representative of a parameter of the first vehicle, and wherein the first value is one of the plurality;
- comparing each one of the plurality of values to a respective threshold value; and
- depending on whether each one of the values is greater than (in some examples, less than) its respective threshold, issuing an alert.

Statement 4. The method of Statement 3 wherein each value of the plurality is one of: the brake pedal pressure of the first vehicle, the speed of the first vehicle, the speed of the first vehicle engine, the steering wheel angle of the first vehicle, the accelerator pressure of the first vehicle, the state of at least one indicator of the first vehicle, the gear of the first vehicle, and the first vehicle type.

Statement 5. The method of Statement 1, wherein the first parameter is brake pedal pressure and the first value is a brake pedal pressure value and the first threshold is a brake pedal pressure threshold, the method further comprising:
- generating a vehicle speed value representative of the speed of the first vehicle;
- generating an engine speed value representative of the engine speed of the first vehicle;
- comparing the vehicle speed value to a vehicle speed threshold;
- comparing the engine speed value to an engine speed threshold; and,
- when the brake pedal pressure value is less than the brake pedal pressure threshold and the vehicle speed value is greater than the vehicle speed threshold and the engine speed value is greater than the engine speed threshold, issuing an alert.

Statement 6. The method of any preceding statement wherein the alert is issued in real-time or near real-time.

Statement 7. The method of any preceding statement wherein the alert is issued to the driver of the first vehicle, or is issued at a location remote from the vehicle.

Statement 8. The method of any preceding statement wherein selecting the first location from the set of locations comprises:
- analysing, by a processor, location data collected from a monitoring service of a computing system, the location data comprising a set of location data points;
- generating, for each location data point in the location data, a location value representative of a first location parameter of the location data;
- comparing each location value with a first location threshold to determine the set of location data points that have a location value greater than, or less than, the first location threshold; and
- selecting one of the location data points that has a location value greater than, or less than, the first location threshold as the first location.

Statement 9. The method of Statement 8 wherein the location data point in the set of location data points having a location value exceeding the first location threshold that is the closest in distance to the location of the first vehicle is selected as the first location.

Statement 10. The method of Statement 8 or 9 wherein the first location parameter is at least one of: the number of traffic accidents that have occurred at each location data point, the average severity of the traffic accidents that have occurred at that location data point, the traffic data at that location data point, the weather at that location data point, the time of day, the road surface at that location data point.

Statement 11. The method of Statement 8 further comprising:
- generating, for each location data point in the location data, a plurality of values, wherein each one of the plurality of values is representative of a location parameter of the location data, the location value being one of the plurality;
- comparing each one of the plurality of values to a respective threshold; and wherein selecting the first location is based on the comparison.

Statement 12. The method of any preceding statement further comprising:
- generating a second value representative of a second parameter of the first vehicle;
- comparing the second value with at least one of: the behaviour of at least one vehicle within a second distance of the first vehicle and the behaviour of at least one pedestrian within a third distance of the first vehicle;
- and wherein the alert is issued based on the comparison of the second value.

Statement 13. The method of any preceding statement further comprising:
- analysing, by a processor, data collected from a second vehicle located within a third distance of the first location;
- generating a second value representative of the first parameter of the second vehicle;
- comparing the second value with the first threshold; and
- depending on whether the first and second values are greater than (in some examples, less than) the first threshold, issuing an alert.

Statement 14. The method of Statement 1, the method further comprising:
- generating a first plurality of values, wherein each value of the first plurality is representative of a first parameter of the first vehicle, and wherein the first value is one of the first plurality;
- generating a second plurality of values, wherein each value of the second plurality is representative of a second parameter of a second vehicle, the second vehicle being within a fourth distance of the first location;

comparing each one of the first and second pluralities of values to a respective threshold value; and depending on whether each one of the values is greater than (in some examples, less than) its respective threshold, issuing an alert.

Statement 15. The method of Statement 14 wherein each value of the first and second pluralities is one of: the brake pedal pressure of the first vehicle, the speed of the first vehicle, the speed of the first vehicle engine, the steering wheel angle of the first vehicle, the accelerator pressure of the first vehicle, the state of at least one indicator of the first vehicle, the gear of the first vehicle, and the first vehicle type.

Statement 16. A processing apparatus comprising:

a location module configured to select a first location from a set of locations;

a processor configured to analyse data collected from a first vehicle located within a first distance of the first location;

an analytics module configured to generate a first value representative of a first parameter of the first vehicle, and configured to comparing the first value with a first threshold; and configured to issue an alert depending on whether the first value is greater than (in some examples, less than) the first threshold.

Statement 17. The processing apparatus of Statement 16 wherein the analytics module is configured to generate a plurality of values, wherein each value of the plurality is representative of a parameter of the first vehicle, and wherein the first value is one of the plurality, configured to compare each one of the plurality of values to a respective threshold value; and configured to issue an alert depending on whether each one of the values is greater than (in some examples, less than) its respective threshold.

Statement 18. The processing apparatus of Statement 16 wherein the first parameter is brake pedal pressure and the first value is a brake pedal pressure value and the first threshold is a brake pedal pressure threshold, and wherein the analytics module is configured to:

generate a vehicle speed value representative of the speed of the first vehicle;

generate an engine speed value representative of the engine speed of the first vehicle;

compare the vehicle speed value to a vehicle speed threshold;

compare the engine speed value to an engine speed threshold; and, issue an alert when the brake pedal pressure value is less than the brake pedal pressure threshold and the vehicle speed value is greater than the vehicle speed threshold and the engine speed value is greater than the engine speed threshold.

Statement 19. The processing apparatus of any one of statements 16-18 wherein the analytics module is configured to issue the alert in real-time or near real-time.

Statement 20. The processing apparatus of any one of statements 16-19 wherein the analytics module is configured to issue the alert to the driver of the first vehicle, or at a location remote from the vehicle.

Statement 21. The processing apparatus of any one of statements 16-20, wherein the processor is a first processor, the apparatus further comprising a second processor configured to analyse location data collected from a monitoring service of a computing system, the location data comprising a set of location data points; and wherein the analytics module is a first analytics module, the apparatus further comprising a second analytics module configured to:

generate, for each location data point in the location data, a location value representative of a first location parameter of the location data;

compare each location value with a first location threshold to determine the set of location data points that have a location value greater than, or less than, the first location threshold; and select one of the location data points that has a location value greater than, or less than, the first location threshold as the first location.

Statement 22. The processing apparatus of Statement 16 wherein the analytics module is configured to:

generate, for each location data point in the location data, a plurality of values, wherein each one of the plurality of values is representative of a location parameter of the location data, the location value being one of the plurality;

compare each one of the plurality of values to a respective threshold;

and to select the first location based on the comparison.

Statement 23. The processing apparatus of statement 16 wherein the analytics module is configured to:

generate a second value representative of a second parameter of the first vehicle;

compare the second value with at least one of: the behaviour of at least one vehicle within a second distance of the first vehicle and the behaviour of at least one pedestrian within a third distance of the first vehicle;

and to issue the alert based on the comparison of the second value.

Statement 24. The processing apparatus of statement 16 further comprising a processor configured to analyse data collected from a second vehicle located within a third distance of the first location; and wherein the event analytics module is configured to:

generate a second value representative of the first parameter of the second vehicle;

compare the second value with the first threshold; and to issue an alert depending on whether the first and second values are greater than (in some examples, less than) the first threshold.

Statement 25. The processing apparatus of Statement 16, wherein the analytics module is configured to:

generate a first plurality of values, wherein each value of the first plurality is representative of a first parameter of the first vehicle, and wherein the first value is one of the first plurality;

generate a second plurality of values, wherein each value of the second plurality is representative of a second parameter of a second vehicle, the second vehicle being within a fourth distance of the first location;

compare each one of the first and second pluralities of values to a respective threshold value; and issue an alert depending on whether each one of the values is greater than (in some examples, less than) its respective threshold.

Statement 26. A non-transitory machine-readable storage medium, encoded with instructions executable by a processor, the machine-readable storage medium comprising instructions to cause the processor to perform the method of any of Statements 1-15.

Statement 27. A method comprising:
analysing, by a processor, location data collected from a monitoring service of a computing system, the location data comprising a set of location data points;
generating, for each location data point in the location data, a location value representative of a first location parameter of the location data;
comparing each location value with a location threshold to determine the set of location data points that have a location value greater than, or less than, the first location threshold; and
issuing an alert when one of the location values exceeds the location threshold.

Statement 28. The method of Statement 27 where the alert is issued in real-time or near real-time.

While the present disclosure has been illustrated and described in detail in the drawings and foregoing description, such illustration and description are to be considered illustrative or exemplary and not restrictive; the invention is not limited to the disclosed embodiments. Various alternative examples are discussed through the detailed description. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A method, comprising:
   selecting a first location from a set of locations;
   analyzing, by a processor, subsequent to selecting the first location and based on the first location being selected, data collected from a first vehicle located within a first distance of the first location;
   generating a first value representative of a first performance parameter of the first vehicle;
   generating a second value representative of a second performance parameter of the first vehicle;
   comparing at least one of the first and second values with a first threshold;
   transmitting, from the first vehicle, a safety alert in real-time to a traffic light when one of the first and second values is greater than the first threshold; and
   causing, by the traffic light and based on the alert, a light emitted from the traffic light to change from a first color to a second color,
   wherein selecting the first location from the set of locations comprises:
      analyzing, by a processor, location data collected from a monitoring service of a computing system, the location data comprising a set of location data points;
      generating, for each location data point of the set of location data points in the location data, a plurality of location values, wherein each location value of the plurality of location values is representative of each location parameter of a plurality of location parameters of the location data, wherein the plurality of location parameters comprises a number of traffic accidents that have occurred at each location data point, an average severity of traffic accidents that have occurred at that location data point, traffic data at that location data point, weather at that location data point, a time of day, and a road surface at that location data point;
      comparing the each location value with a respective location threshold to determine the set of location data points that have a location value greater than, or less than, the respective location threshold; and
      selecting one of the location data points that has a location value greater than, or less than, the respective location threshold as the first location.

2. The method of claim 1, wherein the first and second performance parameters is at least one of: a brake pedal pressure of the first vehicle, a speed of the first vehicle, a speed of an engine of the first vehicle, a steering wheel angle of the first vehicle, an accelerator pressure of the first vehicle, a rate of change of the steering wheel angle of the first vehicle, a state of at least one indicator of the first vehicle, a gear of the first vehicle, and/or a first vehicle type.

3. The method of claim 1, further comprising:
   assigning a level of traffic safety to the first location.

4. The method of claim 1, further comprising:
   storing the first location in a database.

5. The method of claim 1, wherein the safety alert is issued to a driver of the first vehicle, or is issued at a location remote from the first vehicle.

6. The method of claim 1, wherein the first threshold is based on a behavior of at least one vehicle within a second distance of the first vehicle and a behavior of at least one pedestrian within a third distance of the first vehicle; and wherein the behavior of the at least one pedestrian is monitored by a device, and wherein the safety alert is issued based on the comparison.

7. The method of claim 1, further comprising:
   analyzing, by a processor, data collected from a second vehicle located within a third distance of the first location;
   generating a third value representative of a third performance parameter of the second vehicle;
   comparing the third value with a second threshold; and,
   when the third value is greater than the second threshold, issuing an alert.

8. The method of claim 1, wherein issuing the safety alert further comprises issuing the safety alert to a traffic controller at the first location, the safety alert including an indication for the traffic controller to change a traffic signal at the first location based on the first and second values being greater than the first threshold.

9. The method of claim 1, wherein a value of the first threshold is based on the first location, and wherein the value of the first threshold is different in a second location.

10. The method of claim 1, wherein issuing the safety alert further comprises issuing the safety alert to a police station, the safety alert including an indication to mark the first location as a risk area or to go to the first location based at least in part on the first vehicle.

11. A processing apparatus, comprising a processor configured to:
   select a first location from a set of locations;
   analyze, subsequent to selecting the first location, data collected from a first vehicle located within a first distance of the first location;
   generate a first value representative of a first performance parameter of the first vehicle and a second value representative of a second performance parameter of the first vehicle;
   compare the first and second values with a first threshold or a second threshold, wherein the first performance parameter and the second performance parameter include at least one of: a brake pedal pressure of the first vehicle, a speed of the first vehicle, a speed of an engine of the first vehicle, a steering wheel angle of the first vehicle, an accelerator pressure of the first vehicle, a rate of change of the steering wheel angle of the first vehicle, a state of at least one indicator of the first vehicle, a gear of the first vehicle, and/or a first vehicle type, and wherein the first performance parameter and second performance parameter are different;

transmit, from the first vehicle, an alert in real-time to a traffic light when the first value is greater than or less than the first threshold or the second threshold; and cause, by the traffic light and based on the alert, a light emitted from the traffic light to change from a first color to a second color, wherein selecting the first location from the set of locations comprises:

analyze location data collected from a monitoring service of a computing system, the location data comprising a set of location data points;

generate, for each location data point in the location data, a plurality of location values, wherein each location value of the plurality of location values is representative of a respective location parameter of a plurality of location parameters of the location data, wherein the plurality of location parameters comprises a number of traffic accidents that have occurred at each location data point, an average severity of traffic accidents that have occurred at that location data point, traffic data at that location data point, weather at that location data point, a time of day, and a road surface at that location data point;

compare the each location value with a respective location threshold to determine the set of location data points that have a location value greater than, or less than, the respective location threshold; and select one of the location data points that has a location value greater than, or less than, the respective location threshold at the first location.

12. The processing apparatus of claim 11, wherein the first performance parameter is an engine speed of the vehicle and where second performance parameter is a speed of the vehicle, and wherein the processor is further configured to:

generate a third value representative of a third performance parameter of the first vehicle, the third performance parameter being a brake pressure value of the vehicle, wherein the third performance parameter is different than the first performance parameter and the second performance parameter;

compare the third value with a third threshold; and wherein issuing the safety alert is further based on the third value being less than the third threshold.

13. The processing apparatus of claim 11, wherein the second threshold associated with the second performance parameter is adjusted based on the second value.

14. A non-transitory machine-readable storage medium, encoded with instructions executable by a processor, the machine-readable storage medium comprising instructions to cause the processor to:

select a first location from a set of locations;

analyze, subsequent to selecting the first location, data collected from a first vehicle located within a first distance of the first location;

generate a first value representative of a first performance parameter of the first vehicle, wherein the first performance parameter is a brake pedal pressure of the first vehicle;

generate a second value representative of a second performance parameter of the first vehicle, wherein the second performance parameter is a speed of the vehicle;

generate a third value representative of a third performance parameter of the first vehicle, wherein the third performance parameter is an engine speed of the first vehicle;

determine that the first value is less than a first threshold value;

determine that the second value is greater than a second threshold value;

determine that the third value is greater than a third threshold value;

transmit, from the first vehicle, a safety alert in real time to a traffic light based on the determination that the first value is less than a first threshold value, the determination that the second value is greater than a second threshold value, and the determination that the third value is greater than a third threshold value; and cause, by the traffic light and based on the alert, a light emitted from the traffic light to change from a first color to a second color, wherein selecting the first location from the set of locations comprises:

analyze location data collected from a monitoring service of a computing system, the location data comprising a set of location data points;

generate, for each location data point of the set of location data points in the location data, a plurality of location values, wherein the plurality of location values is representative of a plurality of location parameters of the location data, wherein the plurality of location parameters comprises a number of traffic accidents that have occurred at each location data point, an average severity of traffic accidents that have occurred at that location data point, traffic data at that location data point, weather at that location data point, a time of day, and a road surface at that location data point;

compare the each location value with a respective location threshold to determine the set of location data points that have a location value greater than, or less than, the respective location threshold; and select one of the location data points that has a location value greater than, or less than, the respective location threshold as the first location.

\* \* \* \* \*